United States Patent
Schwarzmann (10) Patent No.: US 7,353,220 B2
(45) Date of Patent: Apr. 1, 2008

(54) SYSTEMS, METHODS, AND ARTICLES OF MANUFACTURE FOR DYNAMIC ASSIGNMENT RETRIEVAL

(75) Inventor: Winfried Schwarzmann, Rauenberg (DE)

(73) Assignee: SAP AG, Walldorf (DE)

( * ) Notice: Subject to any disclaimer, the term of this patent is extended or adjusted under 35 U.S.C. 154(b) by 498 days.

(21) Appl. No.: 11/025,051

(22) Filed: Dec. 30, 2004

(65) Prior Publication Data

US 2006/0026124 A1 Feb. 2, 2006

(30) Foreign Application Priority Data

Jul. 14, 2004 (EP) ................... 04016605

(51) Int. Cl.
*G06F 17/30* (2006.01)
*G06F 17/00* (2006.01)
(52) U.S. Cl. ..................... 707/2; 707/104.1
(58) Field of Classification Search .............. 707/2, 707/104.1; 705/5–8
See application file for complete search history.

(56) References Cited

U.S. PATENT DOCUMENTS

| | | | |
|---|---|---|---|
| 2003/0014286 A1* | 1/2003 | Cappellini | 705/5 |
| 2003/0172135 A1* | 9/2003 | Bobick et al. | 709/220 |
| 2004/0103117 A1* | 5/2004 | Segler | 707/104.1 |
| 2006/0020789 A1* | 1/2006 | Gipps et al. | 713/167 |

\* cited by examiner

*Primary Examiner*—Uyen Le
(74) *Attorney, Agent, or Firm*—Finnegan, Henderson, Farabow, Garrett & Dunner, LLP (57) ABSTRACT

Memory-efficient techniques are disclosed for the dynamic retrieval of assignments concerning, for example, the transportation of goods or information between discrete transportation states (such as coordinates of geographical sites or IP addresses of different computers) is described. Embodiments of the invention allow to dynamically determine from the master data, for an element g of the input set G (e.g., transportation states), an application assignment set A(g) of elements (m,p) of the Cartesian product of the condition set M (e.g., transportation constraints) and the value set P (data associations), taking into account the hierarchical organization of the input set G and the condition set M. The data assignment set A(g) may be processed by transportation path optimization mechanisms.

20 Claims, 6 Drawing Sheets

Dynamic (MTr,TSP) assignments to Geo

| Geo | MTr | TSP |
|---|---|---|
| C3 | Truck | TSP5, TSP4 |
| | Truck 40' | TSP3 |
| C2 | Truck 40' | TSP8 |
| | Rail | TSP1, TSP2 |
| | Land | TSP4 |
| C1 | Ship | TSP1 |
| | Rail | TSP1, TSP2, TSP4 |
| | Truck | TSP4 |
| R2 | Land | TSP5 |
| | Truck 40' | TSP3 |
| R2 | Rail | TSP1, TSP2, TSP4 |
| | Land | TSP4 |
| R1 | Ship | TSP1 |

Static MTr assignments to Geo

| Geo | MTr |
|---|---|
| C3 | Truck |
| R1 | Truck, Ship |
| R2 | Land |

Fig. 6

Static TSP assignments to (Geo,MTr)

| Geo | MTr | TSP |
|---|---|---|
| C3 | Land | TSP5 |
| C3 | Truck 40' | TSP3 |
| C2 | Truck 40' | TSP8 |
| R1 | Ship | TSP1 |
| R2 | Rail | TSP1, TSP2 |
| R2 | Root | TSP4 |

Fig. 7

Dynamic MTr assignments to Geo

| Geo | MTr |
|---|---|
| C3 | Truck |
| C2 | Land |
| C1 | Ship, Land (==Root) |
| R2 | Land |
| R1 | Truck, Ship |

Fig. 8

Dynamic (MTr,TSP) assignments to Geo

| Geo | MTr | TSP |
|---|---|---|
| C3 | Truck | TSP5, TSP4 |
|  | Truck 40' | TSP3 |
| C2 | Truck 40' | TSP8 |
|  | Rail | TSP1, TSP2 |
|  | Land | TSP4 |
| C1 | Ship | TSP1 |
|  | Rail | TSP1, TSP2, TSP4 |
|  | Truck | TSP4 |
| R2 | Land | TSP5 |
|  | Truck 40' | TSP3 |
| R2 | Rail | TSP1, TSP2, TSP4 |
|  | Land | TSP4 |
| R1 | Ship | TSP1 |

Fig. 9

SYSTEMS, METHODS, AND ARTICLES OF MANUFACTURE FOR DYNAMIC ASSIGNMENT RETRIEVAL

RELATED APPLICATIONS

This application claims the benefit of European Patent Application No. 04016605.0, filed Jul. 14, 2004, the content of which is expressly hereby incorporated by reference in its entirety.

BACKGROUND

1. Technical Field

The invention relates to the technical field of efficiently handling hierarchical application data. More particularly, the invention relates to a storage concept that allows the memory-efficient provision of application data for processes such as transportation path optimization mechanisms.

2. Background Information

Hierarchical application data is processed in a variety of different contexts. As an example the generation of transportation models for computer-implemented processing tasks such as transportation path optimization can be mentioned.

Such transportation models help to solve problems relating to the transportation of tangible and intangible objects. Tangible objects such as fluids have to be transported via complex pipeline systems. Goods such as construction material require transportation between remote geographical places across a network of ground, air and sea ways. Intangible objects like electrical signals have to be transported for example within the highly complex wiring system in an airplane. Other intangible objects such as information in the form of electronic mails is sent across the World Wide Web via a plurality of intermediary routers.

Transportation paths have to be planned taking into account prevailing transportation constraints (such as network bandwidth, pipeline diameter, availability of transportation links, of transportation means, and of transportation hubs, etc.). Transportation information such as data pertaining to individual transportation service providers may be associated with the transportation constraints to generate transportation associations. Based, inter alia, on the transportation constraints and transportation associations, transportation paths can be optimized. Such an optimization usually aims at saving resources (e.g., at reducing the number of intermediary components involved in a particular transportation task, at reducing transportation duration, etc.).

In order to deal with complex transportation data, a representation of the transportation data in well-organized hierarchical data structures is desirable. Such hierarchical data structures usually include two or more hierarchy levels. On the lowest level for example, individual transportation states may be defined by means of coordinate sets, individual Internet protocol (IP) addresses or ZIP codes. On a higher level, (aggregated) transportation states that include zero, one or more transportation states of lower levels may exist. Such aggregated transportation states may stretch over a range of coordinates or over a set of IP addresses or over a ZIP code range. Path optimization mechanisms calculate an optimum path from a source state to a destination state via a plurality of intermediary states. These calculations are typically based on assignments of transportation constraints and transportation associations to individual transportation states and to transportation lanes connecting two transportation states.

Taking into account that thousands of transportation states can be defined, it becomes evident that calculation time and memory usage are critical parameters of any process that acts on transportation models or any other data assignments with an inherent hierarchical structure. Accordingly, there is a need for a technique that allows a flexible and memory-efficient provision of application data assignments.

SUMMARY

According to one aspect of the invention a method for the dynamic retrieval of assigned application data is provided. This method comprises the steps of providing master data including an input set G of hierarchically organized data g, a condition set M of hierarchically organized data constraints m, for each element g of the input set G a static condition assignment set $IM(g)$ with elements m of the condition set M, and for each element $(g,m)$ of the Cartesian product of the input set G and the condition set M a static value assignment set $IP(g,m)$ with data associations p included in a value set P, and of dynamically determining for an element g of the input set G from the master data an application assignment set $A(g)$ with one or more elements $(m,p)$ of the Cartesian product of the condition set M and the value set P, taking into account the hierarchical organization of the input set G and the condition set M.

The hierarchical organizations of the input set G and the condition set M may be of a tree-type or any other type that allows relating entities on different hierarchy levels. As an example, the hierarchical organizations may include arbitrary parent-child relationships.

The above master data definitions allow a dynamic retrieval of the application assignment set (which may subsequently be processed by transportation optimization mechanisms) exploiting the hierarchical data set organizations. In other words, the application assignment set need not be stored statically in a database. Rather, the application assignment set (or one or more assignments included therein) may be generated dynamically by an application component as required. Accordingly, the dynamic approach allows generating individual assignments exactly at the time they are required by the application component. This implies that the retrieved assignment data may always be up-to-date, meaning that it takes even the latest master data changes into account.

Exploiting the hierarchical data set organizations, master data definitions can be reduced to a minimum. This leads to a strong reduction of storage requirements compared with the situation that the complete assignment set is statically stored in a database.

A further advantage of the specific master data definitions is the fact that master data maintenance is facilitated as no complex assignment entity need to be kept in the database. Rather, the master data may be distributed over a plurality of individual, logically (and intuitively) structured database entities.

In addition to the steps initially mentioned, the method may further include the step of dynamically determining a dynamic condition set $M(g)$ that for a given element g of the input set G contains the static condition assignment set $IM(g)$ for this element g or, if for this element g the static condition assignment set $IM(g)$ is empty, the union of the static condition assignment sets $IM(g')$ of all parents g' of g. A compressed condition set $M^*(g)$ may be dynamically determined from the dynamic condition set $M(g)$ by removing all elements m for which in this dynamic condition set $M(g)$ a parent m' exists.

For each element m of the compressed condition set $M^*(g)$ a children set $cM^*(g)$ and a relatives set $rM^*(g)$ of this element m may be determined. In the present context, the relatives of an element include the children and the parents of this element and the element itself.

In one variation, the method further comprises the step of determining an auxiliary assignment set $IA(g)$ with assignments (m',p) of elements m' of the relatives set $rM^*(g)$ and elements p of the value set P, where g' is at least one of g and a parent thereof, and there exists at least one element p in the static value assignment set $IP(g',m')$.

The application assignment set $A(g)$ may be determined as follows. An element (m,p) of the auxiliary assignment set $IA(g)$ is included into the application assignment set $A(g)$ if this element is contained in at least one of the compressed condition set $M^*(g)$ and the children set $cM^*(g)$. For each element (m,p) of the auxiliary assignment set $IA(g)$ which is not included in the application assignment set $A(g)$, all assignments (m',p) are included into the application assignment set $A(g)$ if m' is in the compressed condition set $M^*(g)$ and m' is a child of m.

At least one of the input set and the condition set may be obtained as the Cartesian product of two ordered or partly ordered sets. The value set may be obtained as the Cartesian product of two arbitrary (i.e., ordered, partly ordered or not ordered) sets.

Some or all master data, in particular the condition assignment set and the value assignment set, may be kept and maintained independently from each other in a database. For example, the condition assignment set and the value assignment set may be kept in one or more database tables. The application assignment set (or elements thereof) may temporarily (e.g., while the application is running) be kept in a memory portion such as a random access memory (RAM).

Assignments for the static condition assignment set of elements of the condition set to elements of the input set may be bundled on the highest possible hierarchy level of the input set. Likewise, assignments for the static value assignment set of elements of the value set to elements of the Cartesian product of the input set and the condition set may be bundled on the highest possible hierarchy level of the input set and the condition set. This bundling helps to further reduce the amount of master data that need to be provided.

The invention can be implemented in any processing context that allows organizing the data to be processed in the manner described above for the master data. The invention is particularly useful if data relating to transportation models need to be processed. Such transportation models are employed to describe and/or optimize the transportation of tangible or intangible objects between predefined transportation states. In a transportation context, the elements g of the input set G may relate to such transportation states, the elements m of the condition set M relate to transportation constraints, and the elements p of the value set P relate to transportation association data.

Depending on the particular transportation scenario, the transportation states may relate to different hierarchical entities like one IP address/set or range of IP addresses, single wire/wire bundle, single ZIP code/ZIP code range, geographical location/zone/lane, and the like. In one variation, the transportation states relate to hierarchically structured locations, zones (a zone including zero, one or more locations), and transportation lanes (a transportation lane connecting two transportation states).

The transportation constraints may relate to data reflective of hierarchically structured transportation means such as categorized vehicle classes (sea transport/ship/express ship), and so on. The transportation associations may relate to supplemental transportation information such as information about or required by transportation service providers.

Retrieval of the application assignment set (i.e., one or more assignments included therein) may be initiated in various ways. In one variation, generation of the application assignment set is initiated in response to a corresponding request that may specify a particular element of the input set for which an application assignment set is to be retrieved. Such requests are typically generated by an application during runtime. In such a request scenario, the method may further comprise the steps of receiving a retrieval request signal and starting to retrieve the application assignment set in response to the retrieval request signal.

If the retrieval request signal is generated upon a user interaction (or otherwise), the method may output for a given transportation state or lane valid combinations of one or more transportations constraints and one or more transportation associations. In addition or as an alternative to outputting such combinations, a path optimization mechanism may be performed between at least one first element of the input set (source state) and at least one second element of the input set (destination state) on the basis of the application assignment sets (i.e., on the basis of one or more assignments included therein) of all involved transportation states or lanes.

The invention may be practiced as a software solution, as a hardware solution or as a combination thereof. As regards a software solution, the invention relates to computer program product comprising program code portions for performing the steps of the invention when the computer program product is run on one or more computers. The computer program product may be stored on a computer readable recording medium.

As regards a hardware solution, a computer system for the dynamic retrieval of assigned application data is provided. The computer system comprises a database for providing master data including an input set G of hierarchically organized data g, a condition set M of hierarchically organized data constraints m, for each element g of the input set G a static condition assignment set $IM(g)$ with elements m of the condition set M, and for each element (g,m) of the Cartesian product of the input set G and the condition set M a static value assignment set $IP(g,m)$ with data associations included in a value set P. The system further includes a processor for dynamically determining from the master data for an element g of the input set G an application assignment set $A(g)$ with of elements (m,p) of the Cartesian product of the condition set M and the value set P, taking into account the hierarchical organization of the input set G and the condition set M. The processor is in charge of interpreting the instructions of an application that may be provided in the form of a compiled program code.

The computer system may be implemented as a single-tier system. It may alternatively be configured as a multi-tier system including, for example, a database tier (or database layer) and an application tier (or application layer).

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described herein.

BRIEF DESCRIPTION OF THE DRAWINGS

The accompanying drawings are incorporated in and constitute a part of this specification and, together with the description, explain the principles of the invention. In the drawings.

DETAILED DESCRIPTION

In the following description, for purposes of explanation and not limitation, specific details are set forth, such as particular data models and processes utilized in connection therewith in order to provide a thorough understanding of the present invention. It will be apparent to one skilled in the art that the present invention may be practiced in other embodiments that depart from these specific details.

In particular, while the different embodiments described herein below are incorporated into or used in conjunction with particular types of data storage, data representation, and hierarchical functionalities, it will be appreciated by the skilled artisan that the present invention is applicable to a wide variety of data storage types, data representation mechanisms, and hierarchical functionalities. Although the invention will be illustrated using embodiments relating to transportation models, the invention is not restricted to processing data in a transportation context. Moreover, the invention will exemplarily be described with respect to a client/server computing approach. The invention is, however, not limited to such a computing approach. Where appropriate, the same reference numbers will be used throughout this detailed description in conjunction with the drawings to refer to the same or like parts.

One possible configuration in which the present invention can be carried out is the so-called three-tiered architecture, which separates a network system's components into three functional groups: presentation, application, and database. This is illustrated in FIG. 1 in a hardware-related view.

Figure 1:
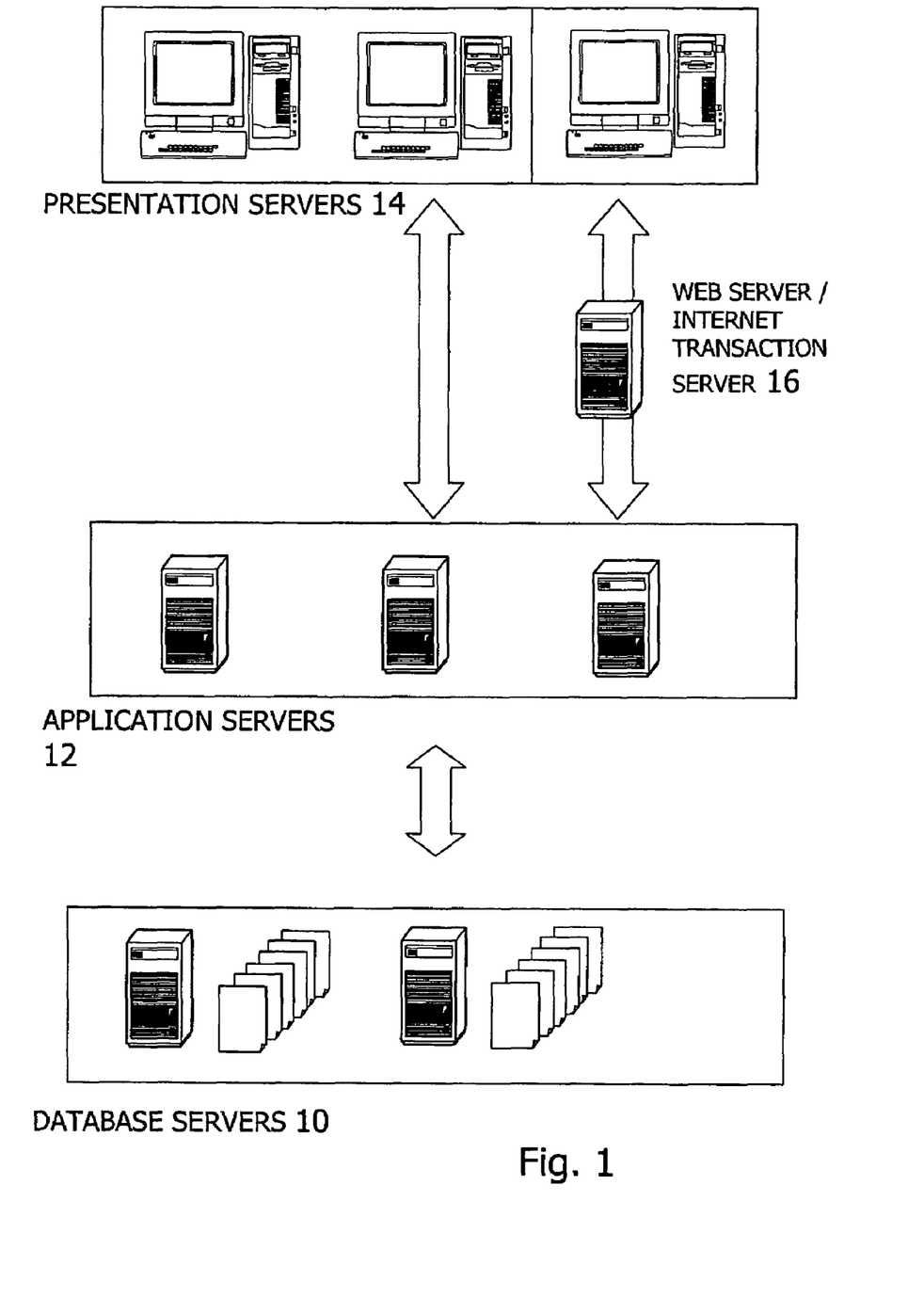
FIG. 1 is a schematic diagram illustrating a hardware-oriented view of a three-tiered client/server configuration in which the invention can be practiced.

With the three-tiered architecture shown in FIG. 1, each hardware group is configured to support demands of its functions. One or more database servers 10 on a bottom layer contain system databases. Application servers 12 on an intermediate layer interfacing the database servers 10 include the processing logic of the system with services such as spooling, dispatching user requests, and formatting data. The tasks related to data presentation are handled on a top layer by presentation servers 14, which are typically personal computers or workstations, enabling easy access to the system. External presentation servers 14 may be connected to the application servers 12 via the Internet and a Web server/Internet transaction server 16. Communication among the three tiers can be accomplished with the use of standard protocol services, such as the ones provided by TCP/IP or CPIC. CPIC stands for Common Programming Interface Communication and includes standard functions and services for program-to-program communication.

Figure 2:
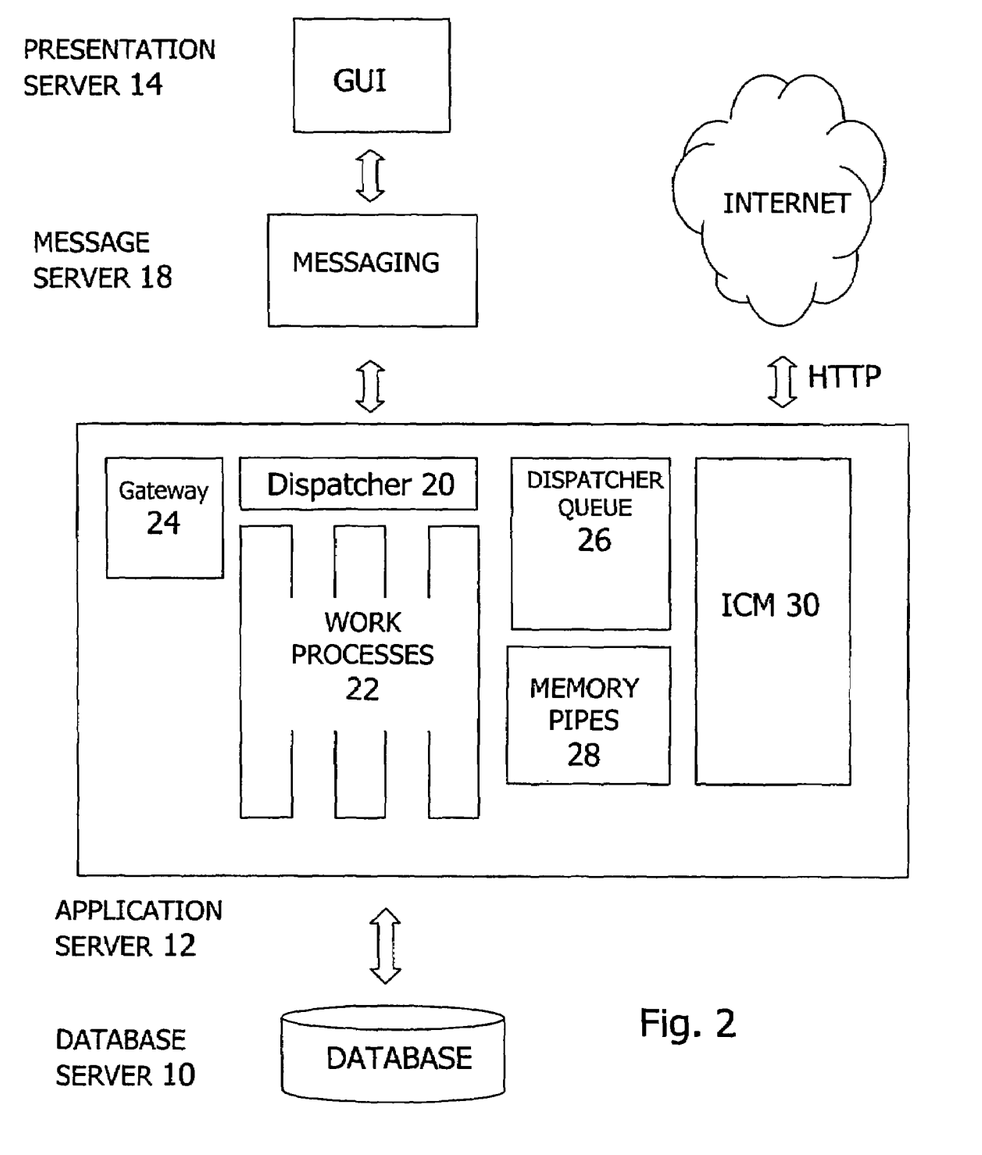
FIG. 2 is a schematic diagram illustrating a software-oriented view of a three-tiered client/server configuration of FIG. 1.

The three-tiered hardware architecture that is depicted in FIG. 1 is shown in FIG. 2 in a software-related view. As becomes apparent from FIG. 2, the software components used in context with the present invention include a graphical user interface (GUI) installed on each presentation server 14 of FIG. 1, an application component (or simply application) that runs on the application server 12 and a database component installed on database servers 10. The application component has interfaces to the database component, to the Internet and, via a messaging component installed on a message server 18, to the GUI. The message server 18 is a service used by different application servers 12 to exchange data and internal messages. The main tasks of the message server 18 include the transfer of messages and the distribution of workload between individual application servers 12.

The application running on the application server 12 includes a dispatcher 20 interfacing the message server 18 and one or more presentation servers 14 on the one hand and a plurality of parallel work processes 22 on the other hand. Each work process 22 has an interface to the database on the database server 10.

Furthermore, a gateway 24 is provided that may either be installed, from a hardware point of view, on the application server 12 or on a dedicated gateway server (not shown). The gateway service provided by the gateway 24 allows for a communication between different applications using the CPIC protocol. The function of the gateway 24 is to exchange large amounts of data between application servers, in contrast to the message server 18 which only exchanges brief internal and control messages. The application component depicted in FIG. 2 further includes dispatcher queues 26, memory pipes 28 and an Internet Communication Manager (ICM) 30, interfacing the Internet.

In the following the interrelation and cooperation among the individual software components depicted in FIG. 2 will be described in more detail.

As data is entered in the presentation server 14 (or otherwise generated), the data is received by the GUI, converted to a standard format, and sent via the messaging server 18 to the dispatcher 20. The connection between the GUI on the presentation server 14 and the dispatcher 20 is made with a protocol like DIAG, according to which small data packages are sent through the connecting network.

The dispatcher 20 checks whether there are work tasks that need to be processed. A complex workflow typically involves a plurality of such work tasks. If no work process 22 is available for processing a received work task, the work task is kept together with other tasks in the dispatcher queues 26 until a work process 22 becomes available.

Once a work process 22 becomes available, the dispatcher 20 sends the user data to the available work process 22. A work process 22 is a program in charge of executing the application tasks of the present invention. Each work process 22 acts as a specialized system service. From the point of view of an operating system, a group of parallel work process 22 as depicted in FIG. 2 makes up a runtime system. Each individual work process 22 includes a task handler, a processor, and a database interface (not shown).

The work process 22 may execute dialogue steps for the presentation server 14. These steps generally relate to the processing or display of a single GUI screen, which means that right after one work process 22 finishes the execution of a dialogue step for a user session, it is immediately available for use by another user session. For its processing, each dialogue step needs code, dictionary objects, and data. These elements may come from the database residing on the database servers 10 or from an internal memory of the application server 12. Within a dialogue step, a task handler (not shown) is in charge of assigning the corresponding tasks to the internal components (dialogue interpreter and processor), finally sending a SQL request to the database servers 10. The database servers 10 send the requested data back to the requesting work process 22, which in turn process it and passes it via the dispatcher 20 to the presentation server 14. The GUI on the presentation server 14 formats the requested data and builds up the screen for the user.

If during a particular work process 22 application data has to be exchanged with other applications such as legacy applications or external applications, the functionality of the gateway 24 is activated.

The ICM 30 allows the direct processing of HTTP requests coming from the Internet and/or a browser running on a presentation server 14, and for sending HTTP requests as HTTP client requests to the Internet. The ICM 30, which may be configured as a dedicated kernel process, uses threads to communicate as a server or as a client on the Internet. If a work process 22 is processing an HTTP request, the memory pipes 28 are used for data transfer. The memory pipes 28 are located in a shared memory portion. In its Web client position a work process 22 creates an HTTP request, which is sent to a Web server. It then receives the HTTP response and the work process 22 proceeds on the basis of the HTTP response.

The application running on the application server 12 of FIG. 2 is configured to process hierarchically related application data. The source code of the application can be written in various programming languages. More specifically, the application may be implemented in any programming language which is able to represent hierarchical relationships flexibly and efficiently.

In the following it is assumed that the application is written in an object-oriented programming language such as Java, C++ or the Advanced Business Application Programming Language ABAP OO. Using such object-oriented programming languages, elements of an input set, elements of a condition set and elements of a value set can be defined as application classes (that may be derived from appropriate base classes). The application instantiates application objects from these classes during run-time. The particular application entities described hereinafter are thus objects instantiated from associated classes. For the sake of simplicity, however, the application entities will simply be referred to by common names such as location (instead of location object instantiated from a subclass location of a base class geographical object), zone (instead of zone object instantiated from a subclass zone of a base class geographical object), and so on.

In the following, various embodiments for implementing the invention will be described. In order to facilitate a better understanding of the invention, the basic terminology used hereinafter will be defined first. References to static assignments etc. generally refer to database-related aspects, whereas references to dynamic assignments etc. generally indicate that the application running on the application server 12 is involved.

Partially Ordered Set: Let X be an arbitrary partially ordered set with comparison operator>. For $x_1, x_2 \in X$ the comparison $x_1 \geq x_2$ signifies that either $x_1 = x_2$ or $x_1 > x_2$ holds. If $x_1 > x_2$, then $x_1$ is called a parent of $x_2$, and, equivalently, $X_2$ is called a child of $x_1$. Notation: $x_1 \in \text{Parents}(x_2)$, $x_2 \in \text{Children}(x_1)$. Further, $x_1$ is called a relative of $x_2$ if either $x_1 \in \text{Parents}(x_2)$, or $x_1 = x_2$, or $x_1 \in \text{Children}(x_2)$ is true. Notation: $x_1 \in \text{Relatives}(x_2)$.

Hierarchy Principle: A parent is representing all its children. This means that if a statement $S(x_1)$ is true or false for $x_1 \in X$, then automatically $S(x_2)$ is true or false for $x_2 \in \text{Children}(x_1) \subseteq X$, respectively.

Input Set: The input set G is a partially ordered set like X. In an exemplary transportation context, the input set G represents geographical objects such as hierarchically organized transportation states and/or transportation lanes.

Condition Set: The condition set M is a partially ordered set like X. In the exemplary transportation context, the condition set M represents hierarchically organized transportation constraints such as data characteristic of available means of transportation (MTr) or characteristics thereof.

Value Set: The value set P is an arbitrary set (i.e., it may be ordered, partially ordered or not ordered). In the transportation context, the value set P may represent transportation associations such as data pertaining to transportation service providers (TSP).

Combinations of Partially Ordered Sets: Let $X_1, \ldots, X_k$ be arbitrary partially ordered sets with comparison operator>. The set $X = X_1 \times \ldots \times X_k$ is also partially ordered if its comparison operator> is defined for $X = (x_1, \ldots, x_k) \in X$ and $y = (y_1, \ldots, y_k) \in X$ such that $x > y \Leftrightarrow x_1 > y_1, \ldots, x_k > y_k$ holds. Incomplete static assignments, that is assignments not including all components, are completed with the help of an extra element $\text{super}(X_i) \in X_i$ for all involved partially ordered sets. It is an artificial parent for all so-far parentless elements. Consequently, $\text{super}(X_i) > x_i$ holds.

Example: Let $G = G_1 \times G_2 \times G_3$ and $M = M_1 \times M_2$ be the combinations of partially ordered sets. The condition assignment $(g_1, g_3) \rightarrow (m_2)$ is completed to $(g_1, \text{sup er}(G_2), g_3) \rightarrow (\text{sup er}(M_1), m_2)$.

Condition Assignment Set: Let IM(g) be the set of all static assignments of elements m of the condition set M to elements $g \in G$. Further, $$M(g) = \begin{cases} IM(g), & IM(g) \neq \varnothing \\ \bigcup_{g' > g} IM(g'), & IM(g) = \varnothing \end{cases}$$

is the set of all dynamic ones.

Finally, the compressed assignment set $M^*(g) = M(g) - \{m \in M(g) | \exists m' \in M(g) : m' > m\}$ is equivalent to M(g) according to the Hierarchy Principle. $M^*(g)$ does not contain any related elements, since parents stand for all their children.

In the transportation context, IM(g) may represent the static database entries showing which transportation constraint applies to transportation involving the transportation state or transportation lane $g \in G$.

Value Assignment Set: Let IP(g,m) be the set of all static assignments of elements P of P to $(g,m) \in G \times M$. In the exemplary transportation context, IP(g,m) may represent the static database entries showing which transportation associations are available to provide a particular transportation constraint (e.g. a particular quality of service or a particular vehicle) for transportation in relation to a particular transportation state or transportation lane g or which transportation association has a hub at a particular transportation state g (e.g., for switching MTr).

Dynamic Assignment Set: For the input g∈G the system output is $$A'(g) = A_1'(g) + A_2'(g), \text{ where}$$

$$A_1'(g) = \{(m,p) \in M \times P | m \in M^*(g), \exists g' \geq g, \exists m' \geq m: p \in IP(g',m')\} \text{ and}$$

$$A_2'(g) = \{(m,p) \in M \times P | m \in \text{Children}(M^*(g)), \exists g' \geq g: p \in IP(g',m)\}.$$

A'(g) represents the set of dynamic assignments of elements of M×P to g∈G. It derives its elements from static assignments (m', p) to g or one of its parents, where m'∈Relatives(m). The derivation replaces any parent m' of m∈M*(g) by m in order to fulfill the conditions given by M*(g). It should be kept in mind that in this context M(g) and M*(g) are equivalent according to the Hierarchy Principle.

Dynamic Assignment Determination: The following mechanism is called Dynamic Assignment Determination (DAD). This mechanism constitutes one embodiment of the present invention that allows reducing the amount of master data that have to be provided on a database layer. It can be performed dynamically when needed in an application context. As the master data system (G,M,P,IM,IP) includes a plurality of individual master data entities, maintenance of the master data as whole is facilitated.

The DAD mechanism is dynamically performed by the application running on the application server 12. The application retrieves the required master data (G,M,P,IM,IP) from the database installed on the database server 10 and dynamically determines for one or more given g∈G the corresponding assignments of elements of M×P to g∈G. The dynamically determined assignments may be utilized by the application when performing transportation path optimization mechanisms (that may require the assignments as input data).

The DAD mechanism can be formulated as follows:

1. $M(g) = \begin{cases} IM(g), & IM(g) \neq \emptyset \\ \bigcup_{g' > g} IM(g'), & IM(g) = \emptyset \end{cases}$ 2. $M*(g) = M(g) - \{m \in M(g) \mid \exists m' \in M(g): m' > m\}$.

3. $IA(g) = \{(m, p) \in M \times P \mid m \in \text{Relatives}(M*(g)),$
   $\exists g': p \in IP(g', m)\}$.

4. $A(g) = A_1(g) + A_2(g)$, where
   $A_1(g) = \{(m, p) \in M \times P \mid m \in M*(g),$
   $\exists (m', p) \in IA(g): m' \geq m\}$
   $A_2(g) = \{(m, p) \in M \times P \mid m \in \text{Children}(M*(g)),$
   $(m, p) \in IA(g)\}$.

Showing A'(g)=A(g) can prove the correctness of this algorithm. The proof is omitted here. Since the DAD depends on the partial order of G and M only, it remains correct even if G and/or M are Cartesian products of partially ordered sets like $X = X_1 \times \ldots \times X_k$. Certainly, P may be the Cartesian product of multiple sets, too.

A pseudo-code implementation of the DAD mechanism according to a further embodiment can be formulated as follows:

1. Determine M(g):

```
Select static M-assignments of g into M(g)       // IM(g)
If none exist
    Select static M-assignments of all parents of g into M(g)
```

2. a) Determine M*(g):

```
For all m in M(g)
    If there is a parent of m in M(g)
        Remove m from M(g)       // obsolete due to
                                   Hierarchy Principle
```

2. b) Determine relatives of M*(g):
   Define Children(M*(g)) and Relatives(M*(g)) as empty subsets of M
   For all m in M(g)
       Add all children of m to Children(M*(g))
       Add m plus all children and parents of m to Relatives(M*(g))

3. Determine IA(g):
   For g' in {g}+Parents(g)
       For all m' in Relatives(M*(g))
           Select static P-assignments of (g',m') into P(g',m')
           For all p in P(g',m')
               Add (m',p) to IA(g) if not contained yet.

4. Determine A(g):

```
For all (m,p) in IA(g)
    If m is in Children(M*(g)) or m is in M*(g)       // A2(g) or part
        Add (m,p) to A(g) if not contained yet.
Else
    For all children m' of m in M*(g)
        Add (m',p) to A(g) if not contained yet.
```

In a still further embodiment, the generic master data system (G,M,P,IM,IP) is defined as follows:

1) G is a partially ordered set (input space: master data).
2) M is a partially ordered set (condition space: master data).
3) P is an arbitrary set (value space: master data).
4) Let IM(g) and M(g) represent the static and the dynamic assignments of elements of M to the element g of G (condition assignments: master data).
5) Let IP(g,m) represent the static assignments of elements of P to the element (g,m) of G×M (value assignments: master data).

For the input g the system returns the output A(g). The latter is a subset of M×P and represents the dynamic assignments of elements of M×P to the element g of G. A(g) derives its elements from static assignments (m',p) to g or one of its parents, where m' is an element of M(g) or any relative thereof. The derivation replaces any parent m' of an element m in M(g) by m in order to fulfill the conditions given by M(g).

As initially mentioned, the application running on the application server 12 of FIG. 2 is configured to process hierarchically related application data that fit into the particular master data scheme. The following embodiments (that are based on and/or may be combined with the above embodiments) deal with hierarchically related application data in an exemplary transportation context. Transportation path optimization calculations may be performed on top of the DAD mechanism to find the best path for transporting information or tangible objects from a given source state to a given destination state. Source and destination states may be generated by the application itself. Alternatively, source and destination states may be input via the GUI of the presentation server 14 and then transferred to the work processes 22 of the application server 12 as described above.

In the transportation model of the following embodiments the set G of geographical objects includes (transportation) lanes and a two-level hierarchy of transportation states in the form of locations and zones. A location may belong to none, one or several zones. A lane connects two transportation states.

To each geographical object constraints in the form of data relating to none, one or several means of transportation (MTr) can be statically assigned (as master data). A static assignment of MTr data to a zone is also a dynamic assignment (as transient application data) for all of its locations which do not have any static assignments. There exists a hierarchy of MTr as follows: if MTr m1 is dynamically assigned to the geographical object g, and m1 is the direct or indirect parent of MTr m2, then there exists a dynamic assignment of m2 to g. Finally, transportation associations in the form of supplemental data relating to one or more transportation service providers (TSP) can be statically assigned to any combination (g,m) of a geographical object g and MTr m, regardless whether m is (statically or dynamically) assigned to g. The following embodiments provide mechanisms that give answers to the question which combinations (m,p) of MTr data m and TSP data p are valid for a given geographical object g. In other words, which are the dynamic assignments for g resulting from the collectivity of static assignments?

Figure 3:
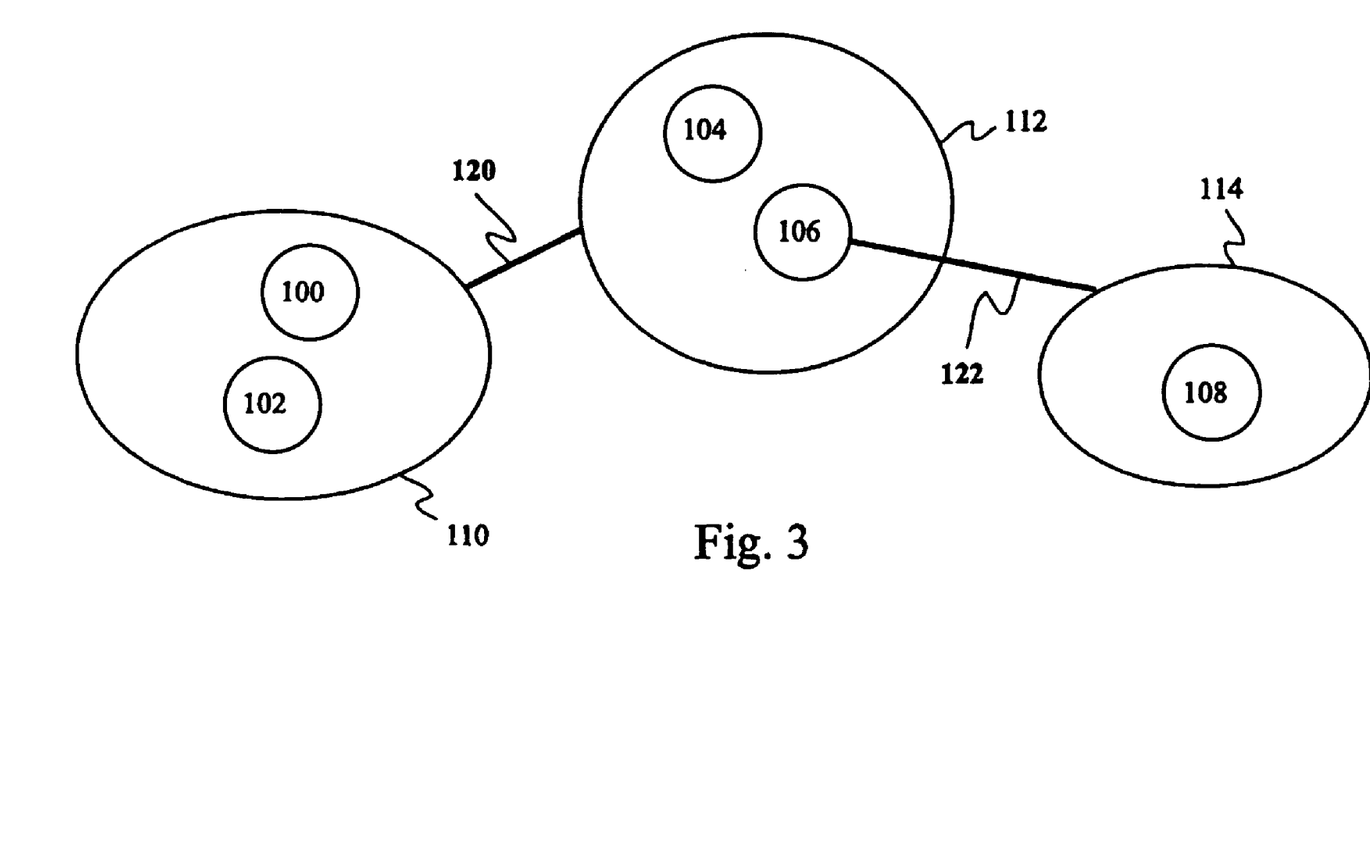
FIG. 3 is a schematic diagram showing an exemplary transportation scenario (including transportation state hierarchies connected by transportation lanes) in which the invention can be practiced.

FIG. 3 is a schematic diagram showing an exemplary transportation scenario (including transportation state hierarchies connected by transportation lanes) based on which a transportation optimization mechanism (including an underlying DAD mechanism) may be performed. The transportation scenario of FIG. 3 includes three zones 110, 112, 114 as transportation states on a higher hierarchy level. The zone 110 comprises two locations 100, 102, the zone 112 comprises two locations 104 and 106, and the zone 114 comprises one location 108. Two lanes 120, 122 are shown in FIG. 3. The first lane 120 links the states 110 and 112 (i.e., two zones). The second lane 122 links the states 106 and 108 (i.e., a location with a zone). As mentioned earlier, lanes are explicit links between two discrete states (e.g., either between two locations, between two zones, between a zone and a location or between a location and a zone).

In one variation of the invention, the zones correspond to geographical regions (e.g., USA 110, Western Europe 112, Eastern Europe 114) and the locations correspond to cities (e.g., Chicago 102, New York 100, Hamburg 104, Munich 106, Budapest 108). Each of the zones and locations may be associated with data pertaining to zero, one or more hierarchically organized transportation means such as land transportation/road transportation/truck, air transportation, sea transportation/cargo ship. To each combination of geographical object (i.e., zone or location or lane) and MTr entity, data pertaining to one or more TSPs may be assigned.

In another variation of the invention, the zones 110, 112, 114 and locations 100, 102, 104, 106, 108 are part of a computer network, wherein the locations are routers and the zones represent a part of a larger network, or wherein the locations are personal computers 100, 102, 104, 106, 108 grouped into zones 110, 112, 114. The larger network could be an intranet, a part of the Internet, or the entire Internet. MTr may represent network connections, e.g. broadband connections of different types (e.g., optical, electrical, etc.) and different traffic handling capacities and TSP include data pertaining to associated network service providers.

In still another variation of the invention, the zones 110, 112, 114 and locations 100, 102, 104, 106, 108 are part of a pipeline system which connects them by pipelines and in which MTr represent pipeline links of different types and capacities (e.g., different diameters) with associated TSP data. In yet another embodiment of the invention, the zones 110, 112, 114 and locations 100, 102, 104, 106, 108 are part of a distribution center in which goods (e.g., mail or parcels) or information are transported by individual TSPs (transportation associations) via lanes 120, 122.

Figure 4:
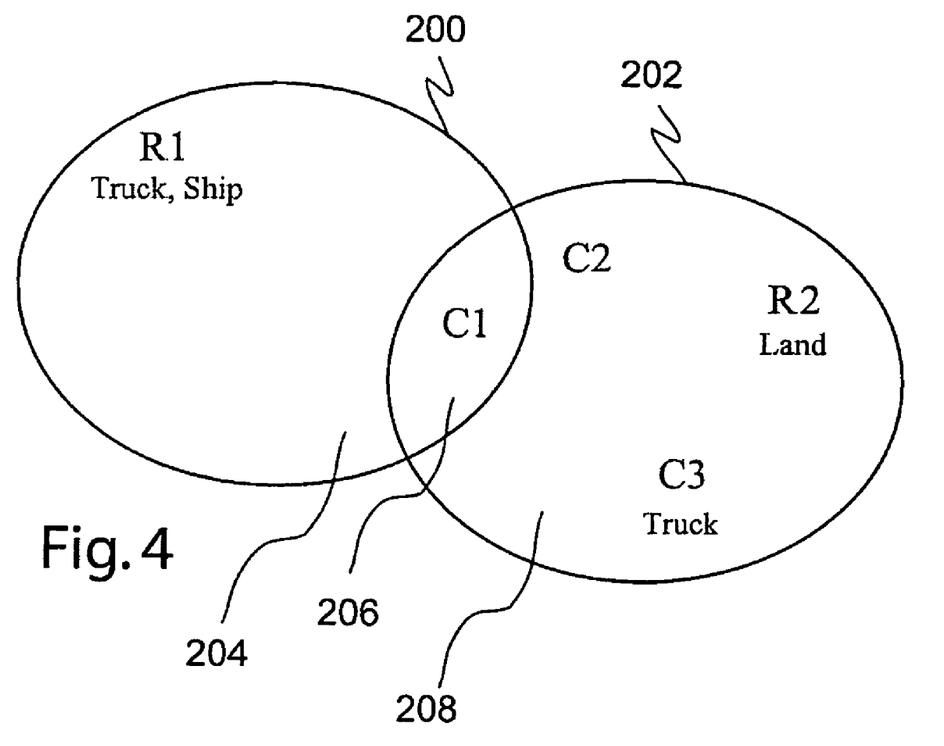
FIG. 4 is a schematic diagram illustrating an example of the static assignment of hierarchically organized transportation constraints to hierarchically organized transportation states.

FIG. 4 shows a schematic diagram of another exemplary transportation scenario (including transportation state hierarchies, but without transportation lanes) based on which a transportation optimization mechanism with an underlying DAD mechanism may be performed.

The transportation state hierarchy of FIG. 4 has two overlapping zones R1 200 and R2 202, the overlap of the zones being denoted by 206 and the non-overlapping parts of the zones R1 200 and R2 202 being denoted by 204 and 206, respectively. The zone R1 200 comprises the location C1. The zone 202 comprises the locations C1, C2, and C3. Within zone R1 200 transportation by MTr truck or ship (transportation constraints) is in principle possible. Likewise, zone R2 allows land transportation, whereas location C3 can not be reached by rail. The transportation state hierarchy depicted in FIG. 4 is stored as static master data (input set) on the database server 10 of FIGS. 1 and 2.

Figure 5:
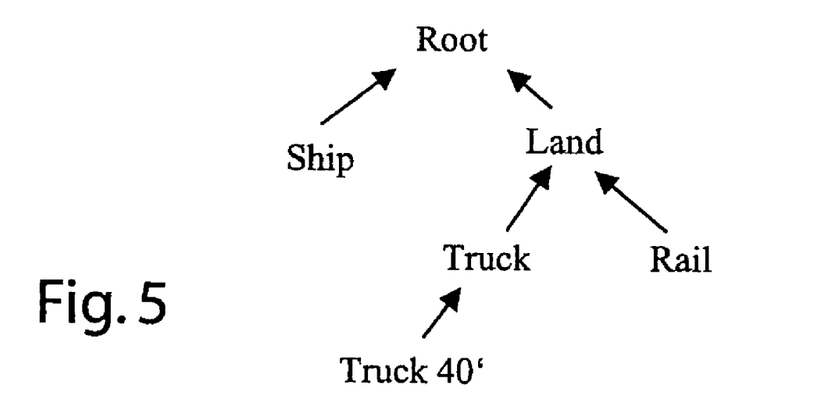
FIG. 5 is a schematic diagram illustrating an example of hierarchically organized transportation constraints.

FIG. 5 shows a hierarchical tree representation of the MTr data for the example of FIG. 4. Root is at the origin of the transportation means tree, land and ship build separate branches. Land is further split up into truck and rail. Truck 40' is a specific truck, which builds another branch of truck. The transportation means hierarchy shown in FIG. 5 is stored as static master data (condition set) on the database server 10.

Figure 6:
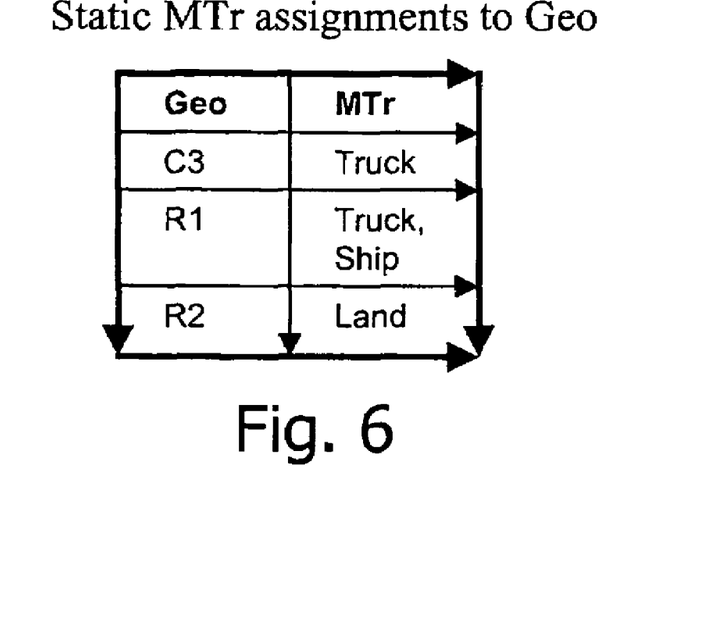
FIG. 6 is a table showing static assignments of means of transportation (MTr) data to individual geographical objects (Geo) for the example shown in FIGS. 4 and 5.

The table of FIG. 6 shows for the example of FIG. 4 the static assignments of data pertaining to MTr to transportation states (Geo) in the form of the geographical objects zone and location. Transportation states C3 and R2 have only one static assignment, respectively. Transportation state R1 has two static assignments, namely truck and ship. The table show in FIG. 6 is stored as master data (condition assignment set) on the database server 10.

Figure 7:
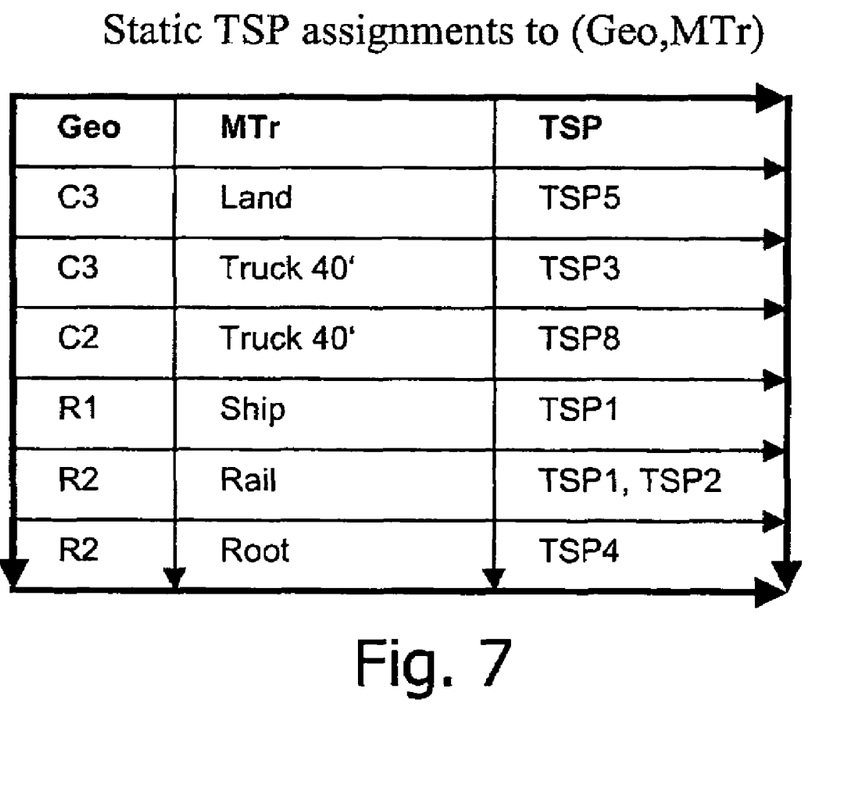
FIG. 7 is a table showing static assignments of transportation service provider (TSP) data to geographical objects (Geo) and means of transportation (MTr) data for the example shown in FIGS. 4 and 5.

The table of FIG. 7 shows static assignments of TSP data to transportation states (Geo) and MTr data for the example of FIG. 4. To each combination of geographical object and means of transportation data pertaining to one or more TSPs is assigned. The table shown in FIG. 7 is stored as master data (value assignment set) on the database server 10. The rightmost column of the table includes the value set of TSP data.

Figure 8:
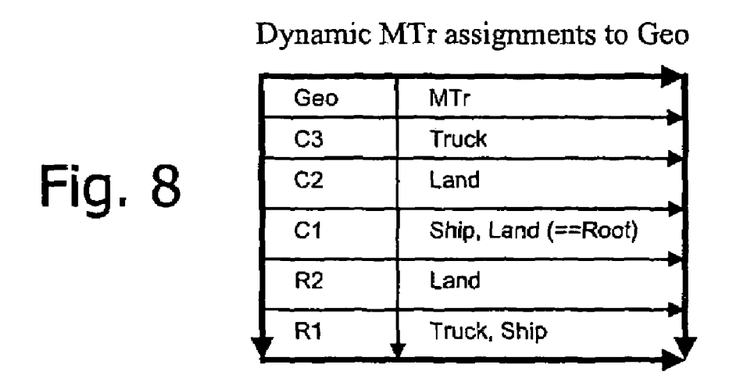
FIGS. 8 and 9 are tables showing dynamic assignments resulting from the hierarchical organizations depicted in FIGS. 4 and 5 and the static assignments depicted in FIGS. 6 and 7.

The table of FIG. 8 shows dynamic assignments of MTr data to geographical objects for the example of FIG. 4. The above discussed DAD mechanism generates the table of FIG. 8 (or required parts thereof) as an intermediate result dynamically on the application server 12 from the master data retrieved from the database 10.

Figure 9:
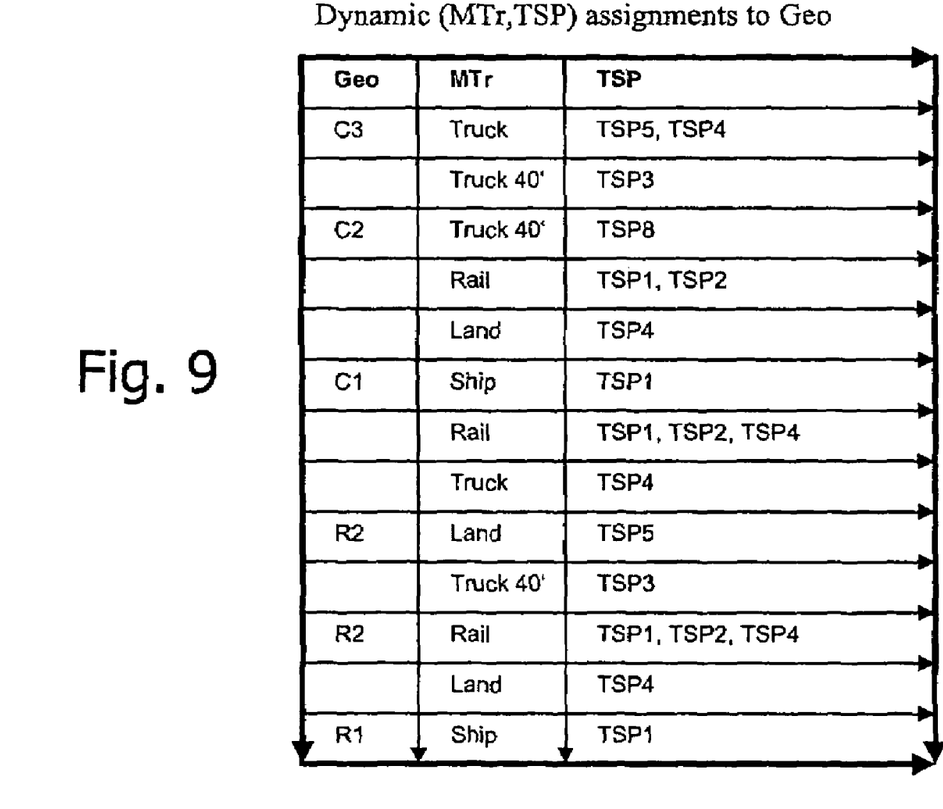

FIG. 9 shows a table with the dynamic assignments of combinations of MTr data and TSP data to zones and locations (Geo) for the example of FIG. 4. Each zone and location is served by one or more MTr that may stem from different layers of the tree representation of FIG. 5, e.g. the assigned hierarchically structured MTr data may be specific such as truck 40' or more general such as land. Each MTr is provided with data pertaining to one or more TSPs, that is, several different transportation service providers may make service with the same MTr. The table of FIG. 9 (or required parts thereof) can be generated dynamically by the application running on the application server 12 from the memory-efficient master data retrieved from the database using the DAD mechanism discussed above. The retrieved data are then utilized for transport path optimization or other purposes.

As has become apparent from FIGS. 4 to 9, the master data are provided in separate and intuitively structured database tables. This facilitates maintenance tasks.

In general, the invention provides a generic system (G,M, P,IM,IP) for the retrieval of dynamic assignments (transient application data) after the static maintenance of only a few assignments (master data). The maintenances for the assignments G→M and P→(M,G) can be done completely independent of each other. The generic system (G,M,P,IM,IP) capitalizes the hierarchies for the reduction of master data. Assignments may be bundled on a higher hierarchy level if possible. By exploiting hierarchical relationships, master data definitions can be reduced to a minimum. Further, the Dynamic Assignment Determination allows the ready-to-use retrieval (or decompression) of the compressed master data.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for determining a transport path between two transportation states using a dynamic retrieval of assigned application data, comprising:
    providing transportation master data including:
        an input set G of hierarchically organized data elements g, wherein the elements g of input set G relate to at least one of transportation states and transportation lanes connecting transportation states;
        a condition set M of hierarchically organized data constraint elements m, wherein the elements m of the condition set M relate to transportation constraints;
        for each element g of the input set G a static condition assignment set IM(g) with elements m of the condition set M; and
        for each element (g,m) of the Cartesian product of the input set G and the condition set M a static value assignment set IP(g,m) with data associations p included in a value set P, wherein the elements p of the value set P relate to transportation associations; and
    determining a transport path between at least one first element g of the input set G and at least one second element g of the input set G via a plurality of third elements g of the input set G including:
        dynamically determining from the transportation master data for elements g of the input set G application assignment sets A(g) with elements (m,p) of the Cartesian product of the condition set M and the value set P, taking into account the hierarchical organization of the input set G and the condition set M; and
        performing transport path optimization taking into account the assignments included in the determined application assignment sets A(g).

2. The method of claim 1, wherein the hierarchical organization of elements includes parent-child relationships.

3. The method of claim 2, further comprising dynamically determining a dynamic condition set M(g) that for a given element g of the input set G contains the static condition assignment set IM(g) for this element g or, if for this element g the static condition assignment set IM(g) is empty, the union of the static condition assignment sets IM(g') of all parents g' of g.

4. The method of claim 3, further comprising dynamically determining a compressed condition set M*(g) from the dynamic condition set M(g) by removing all elements m for which in this dynamic condition set M(g) a parent m' exists.

5. The method of claim 4, further comprising determining for each element m of the compressed condition set M*(g) a children set cM*(g) and a relatives set rM*(g) of this element m, wherein the relatives include the children and the parents of this element m and the element m itself.

6. The method of claim 5, further comprising determining an auxiliary assignment set IA(g) with assignments (m',p) of elements m' of the relatives set rM*(g) and elements p of the value set P, where g' is at least one of g and a parent thereof, and there exists at least one element p in the static value assignment set IP(g',m').

7. The method of claim 6, further comprising including an element (m,p) of the auxiliary assignment set IA(g) into the application assignment set A(g) if this element is contained in at least one of the compressed condition set M*(g) and the children set cM*(g).

8. The method of claim 7, further comprising including, for each element (m,p) of the auxiliary assignment set IA(g) which is not included in the application assignment set A(g), all assignments (m',p) into the application assignment set A(g) if m' is in the compressed condition set M*(g) and m' is a child of m.

9. The method of claim 1, further comprising maintaining at least some master data, in particular the static condition assignment set IM(g) and the static value assignment set IP(m,g), independently from each other in a database.

10. The method of claim 1, further comprising keeping the condition assignment set IM(g) and the value assignment set IP(m,g) in one or more database tables.

11. The method of claim 1, further comprising keeping the static application assignment set A(g) or one or more elements thereof temporarily in a memory portion.

12. The method of claim 1, further comprising bundling for the static condition assignment set IM(g) assignments of elements of the condition set M to elements g of the input set G on the highest possible hierarchy level.

13. The method of claim 1, further comprising performing a path optimization mechanism between a first element g1 of the input set G and a second element g2 of the input set G on the basis of the application assignment sets for all transportation states and/or transportation lanes involved.

14. The method of claim 1, wherein the transportation states relate to hierarchically structured locations and zones, wherein a zone includes zero, one or more locations, and the transportation lanes relate to connections between transportation states.

15. The method of claim 1, wherein the transportation constraints relate to data reflective of hierarchically structured transportation means.

16. The method of claim 1, wherein the transportation associations contain information pertaining to transportation service providers.

17. The method of claim 1, further comprising:
receiving a retrieval request signal specifying an element g of the input set G;
starting to retrieve the application assignment set A(g) for this element g of the input set G in response to the retrieval request signal; and,
outputting the application assignment set A(g) or one or more elements (m,p) thereof.

18. A system for determining a transport path between two transportation states using a dynamic retrieval of assigned application data, comprising:
a database for providing transportation master data including
an input set G of hierarchically organized data elements g, wherein the elements g of the input set G relate to at least one of transportation states and transportation lanes connecting transportation states;
a condition set M of hierarchically organized data constraint elements m, wherein the elements m of the condition set M relate to transportation constraints;
for each element g of the input set G a static condition assignment set IM(g) with elements m of the condition set M;
for each element (g,m) of the Cartesian product of the input set G and the condition set M a static value assignment set IP(g,m) with data associations p included in a value set P, wherein the elements p of the value set P relate to transportation associations; and
a processor for determining a transport path between at least one first element g of the input set G and at least one second element g of the input set G via a plurality of third elements g of the input set G including:
dynamically determining from the transportation master data for elements g of the input set G application assignment sets A(g) with elements (m,p) of the Cartesian product of the condition set M and the value set P, taking into account the hierarchical organization of the input set G and the condition set M; and
performing transport path optimization taking into account the assignments included in the determined application assignment sets A(g).

19. A computer program product, tangibly embodied in a storage medium, for causing a computer to perform a method for determining a transport path between two transportation states using a dynamic retrieval of assigned application data, the method comprising:
providing transportation master data including
an input set G of hierarchically organized data elements g, wherein the elements g of the input set G relate to at least one of transportation states and transportation lanes connecting transportation states;
a condition set M of hierarchically organized data constraint elements m, wherein the elements m of the condition set M relate to transportation constraints;
for each element g of the input set G a static condition assignment set IM(g) with elements m of the condition set M; and
for each element (g,m) of the Cartesian product of the input set G and the condition set M a static value assignment set IP(g,m) with data associations p included in a value set P, wherein the elements p of the value set P relate to transportation associations; and
determining a transport path between at least one first element g of the input set G and at least one second element go of the input set G via a plurality of third elements g of the input set G including:
dynamically determining from the transportation master data for elements g of the input set G application assignment sets A(g) with elements (m,p) of the Cartesian product of the condition set M and the value set P, taking into account the hierarchical organization of the input set G and the condition set M; and
performing transport path optimization taking into account the assignments included in the determined application assignment sets A(g).

20. The computer program product of claim 19, stored on a computer-readable recording medium.

* * * * *